United States Patent
Kim et al.

(10) Patent No.: US 11,463,673 B2
(45) Date of Patent: Oct. 4, 2022

(54) METHOD AND DEVICE FOR TRANSMITTING IMMERSIVE MEDIA

(71) Applicant: Samsung Electronics Co., Ltd., Suwon-si (KR)

(72) Inventors: Dong-Yeon Kim, Seoul (KR);
Young-Wan So, Gunpo-si (KR);
Jae-Hyeon Bae, Seoul (KR);
Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/650,603

(22) PCT Filed: Oct. 16, 2018

(86) PCT No.: PCT/KR2018/012174
§ 371 (c)(1),
(2) Date: Mar. 25, 2020

(87) PCT Pub. No.: WO2019/078580
PCT Pub. Date: Apr. 25, 2019

(65) Prior Publication Data
US 2020/0228780 A1    Jul. 16, 2020

(30) Foreign Application Priority Data
Oct. 17, 2017  (KR) .................. 10-2017-0134909

(51) Int. Cl.
*H04N 13/194*   (2018.01)
*H04N 13/156*   (2018.01)
(Continued)

(52) U.S. Cl.
CPC .......... *H04N 13/194* (2018.05); *G06V 10/25* (2022.01); *H04N 13/156* (2018.05); *H04N 13/178* (2018.05)

(58) Field of Classification Search
CPC .. H04N 13/194; H04N 13/156; H04N 13/178; H04N 21/2387; H04N 21/2393;
(Continued)

(56) References Cited

U.S. PATENT DOCUMENTS

2010/0007476 A1*  1/2010  Klotz ................... G01S 13/867
                                                           340/425.5
2013/0322697 A1* 12/2013  Grindstaff ............... G06T 7/246
                                                              382/107
(Continued)

FOREIGN PATENT DOCUMENTS

CN        106231291 A     12/2016
EP        3 419 295 A1    12/2018
(Continued)

OTHER PUBLICATIONS

English Translation of Korean Publication KR 10-2017-0008137 May 2017.*
(Continued)

*Primary Examiner* — Loi H Tran
(74) *Attorney, Agent, or Firm* — Jefferson IP Law, LLP

(57) ABSTRACT

Provided is a method for supporting an immersive media service by a media transmission device. The method comprises the steps of: determining at least one space among a plurality of spaces of interest (SOI) based on SOI description information; and transmitting, to a media reception apparatus, partial SOI description information among the SOI description information and partial immersive media data among immersive media data, wherein the partial SOI description and the partial immersive media data corresponds to the determined at least one SOI, wherein the partial SOI description information includes at least one of identification information for the at least one SOI, a space
(Continued)

(a) 3DoF (b) 6DoF range indicator for an object of interest (OOI), a priority indicator for the OOI, or an object vector for the OOI.

16 Claims, 12 Drawing Sheets

(51) Int. Cl.
*H04N 13/178* (2018.01)
*G06V 10/25* (2022.01)

(58) Field of Classification Search
CPC ......... H04N 21/44218; H04N 21/4532; H04N 21/816; H04N 21/6587; H04N 21/4728; H04N 13/117; H04N 13/161; H04N 13/366; G06K 9/3233
USPC .......................................................... 348/43
See application file for complete search history.

(56) References Cited

U.S. PATENT DOCUMENTS

| | | | |
|---|---|---|---|
| 2014/0347263 A1 | 11/2014 | Dai et al. | |
| 2015/0195611 A1 | 7/2015 | Kim et al. | |
| 2016/0150212 A1 | 5/2016 | Moura et al. | |
| 2016/0182771 A1 | 6/2016 | Oh | |
| 2017/0053448 A1* | 2/2017 | Kim | G06Q 30/0623 |
| 2017/0084086 A1* | 3/2017 | Pio | H04N 21/816 |
| 2017/0244948 A1 | 8/2017 | Pang et al. | |
| 2018/0091577 A1* | 3/2018 | Park | H04N 21/21805 |
| 2018/0182168 A1* | 6/2018 | Laurent | G06T 19/003 |
| 2018/0349708 A1* | 12/2018 | van Hoof | G08B 13/19684 |
| 2019/0156511 A1* | 5/2019 | Ikeda | G06T 3/00 |
| 2019/0199995 A1 | 6/2019 | Yip et al. | |
| 2020/0084428 A1* | 3/2020 | Oh | H04N 19/46 |
| 2020/0175751 A1* | 6/2020 | Connor | G06F 3/013 |
| 2021/0006833 A1* | 1/2021 | Tourapis | H04N 19/597 |

FOREIGN PATENT DOCUMENTS

| | | |
|---|---|---|
| JP | 2016-105593 A | 6/2016 |
| KR | 10-0355990 B1 | 10/2002 |
| KR | 10-2015-0061459 A | 6/2015 |
| KR | 10-2016-0077548 A | 7/2016 |
| KR | 10-2016-0125708 A | 11/2016 |
| KR | 10-2017-0022078 A | 3/2017 |
| KR | 10-2017-0048137 A | 5/2017 |
| KR | 10-2018-0028950 A | 3/2018 |
| WO | 2017/142353 A1 | 8/2017 |

OTHER PUBLICATIONS

3GPP TSGS System Aspects, Virtual Reality (VR) Media Services Over 3GPP (Release 15), XP051326413, Sep. 11, 2017.
WGII, Working Draft 1.0 of TR Technical Report on Architectures for Immersive Media. XP030023728, International Organization for Standardization Organisation Internationale De Normalisation ISO/IEC JTC 1/SC 29/WG 11 Coding of Moving Pictures and Audio Sep. 13, 2017.
David Wood, Virtual Reality—Prospects for DVB Delivery, Report of the DVB CM Study Mission on Virtual Reality, Oct. 29, 2016.
Extended European Search Report dated Oct. 5, 2020, issued in European Patent Application No. 18868334.6.
Korean Examination Report dated Jul. 23, 2021, issued in Korean Application No. 10-2017-0134909.
Chinese Examination Report dated Mar. 29, 2021, issued in Chinese Application No. 201880067795.4.

\* cited by examiner

| Syntax | Value |
|---|---|
| SOI_descriptor () {     *SOI_id()*     *SOI_start_time*     *SOI_duration*     *SOI_space_structure()*     *SOI_ext_vector() {*         *ext_vector_timestamp*         *ext_vector_x*         *ext_vector_y*         *ext_vector_z*         *ext_vector_extension()*     } | |
|     *num_of_objects* | N1 |
|     for (i=0; i<N1; i++) {         *object_id*         *object_space_structure()*         *object_priority*         *object_speed*         *object_vector() {*             *object_vector_timestamp*             *object_vector_x*             *object_vector_y*             *object_vector_z*             *object_vector_extension()*         }         *object_event()*         *object_role()* | |
|         *num_of_related_objs* | N2 |
|         for (j=0; j<N2; j++) {             *related_obj_id*             *object_dependency*             *internal_vector() {*                 *int_vector_timestamp*                 *int_vector_x*                 *int_vector_y*                 *int_vector_z*                 *int_vector_extension()*             }             *relation_event()*             *relation_role()*         }     } } | |

FIG.9

METHOD AND DEVICE FOR TRANSMITTING IMMERSIVE MEDIA

CROSS-REFERENCE TO RELATED APPLICATION(S)

This application is a National Phase Entry under 35 U.S.C. § 371 of PCT International Application Number PCT/KR2018/012174, which was filed on Oct. 16, 2018, and claims priority to Korean Patent Application Number 10-2017-0134909, which was filed in the Korean Intellectual Property Office on Oct. 17, 2017, the entire contents of each of which are incorporated herein by reference.

BACKGROUND

1. Field

The disclosure relates to a method and apparatus for providing space-of-interest description information corresponding to a predicted viewing point and/or viewing direction of immersive media of a user.

2. Description of the Related Art

The development trend of media technology is toward providing high-quality media to users. Such an example may be immersive media.

Immersive media refers to multimedia including information related to movement of an object in a three-dimensional (3D) space. Specifically, for immersive media, a scene represented in the 3D space is captured in a plurality of two-dimensional (2D) images, and the 2 images are stitched and projected onto a sphere. Virtual reality (VR) media is an example of immersive media.

SUMMARY

When the viewing point of a user who is viewing immersive media is changed, a media reception apparatus may not play the immersive media until receiving data corresponding to the changed viewing point. As a result, the streaming service may have degraded quality and experience a delay.

For this reason, when immersive media are provided in a streaming service, there may be a need for a method of providing data reflecting the viewing point of a user without a time delay. For example, it may be necessary to develop a method of predicting coordinates to which the viewing point of a user will move in a given 3D space and providing data in advance based on the predicted coordinates in order to provide high-quality immersive media without a delay.

An embodiment of the disclosure may provide a method and apparatus generating an element included in a space of interest to predict a new viewing point that a user will take. An element included in a space of interest means information that configures the space of interest. Accordingly, a user device may selectively play immersive media adaptively according to a scene and an object in the immersive media, a network environment, a UE capability, and a user's viewing point based on the element included in the space of interest.

According to various embodiments of the disclosure, a method of supporting an immersive media service by a media transmission apparatus includes determining at least one of a plurality of spaces of interest based on space-of-interest description information, and transmitting, to a media reception apparatus, partial space-of-interest description information corresponding to the determined space of interest out of the space-of-interest description information and partial immersive media data corresponding to the determined space of interest out of immersive media data. The partial space-of-interest description information includes at least one of identification information for the at least one space of interest, a space range indicator for an object of interest, a priority indicator for the object of interest, or an object vector for the object of interest.

According to various embodiments of the disclosure, a method of supporting an immersive media service by a media reception apparatus includes receiving partial space-of-interest description information and partial immersive media data, and playing immersive media based on the partial space-of-interest description information and the partial immersive media data.

According to various embodiments of the disclosure, a media transmission apparatus includes a transceiver and a processor coupled to the transceiver. The processor is configured to determine at least one of a plurality of spaces of interest based on space-of-interest description information, and transmit, to a media reception apparatus, partial space-of-interest description information corresponding to the determined space of interest out of the space-of-interest description information and partial immersive media data corresponding to the determined space of interest out of immersive media data. The partial space-of-interest description information includes at least one of identification information for the at least one space of interest, a space range indicator for an object of interest, a priority indicator for the object of interest, or an object vector for the object of interest.

According to various embodiments of the disclosure, a media reception apparatus includes a transceiver and a processor coupled to the transceiver. The processor is configured to receive partial space-of-interest description information and partial immersive media data, and play immersive media based on the partial space-of-interest description information and the partial immersive media data.

Other details of the embodiments are included in the detailed description and drawings.

According to various embodiments of the disclosure, providing space-of-interest description information to a media reception apparatus may lead to selective and adaptive provisioning of an immersive media service according to the viewing point and/or viewing direction of a user and relieve a constraint imposed on the data size of immersive media data.

BRIEF DESCRIPTION OF DRAWINGS

FIG. 9 is a diagram illustrating a space-of-interest descriptor, when immersive media are transmitted by an MPEG media transport (MMT) protocol according to various embodiments proposed in the disclosure.

DETAILED DESCRIPTION

Figure 1:
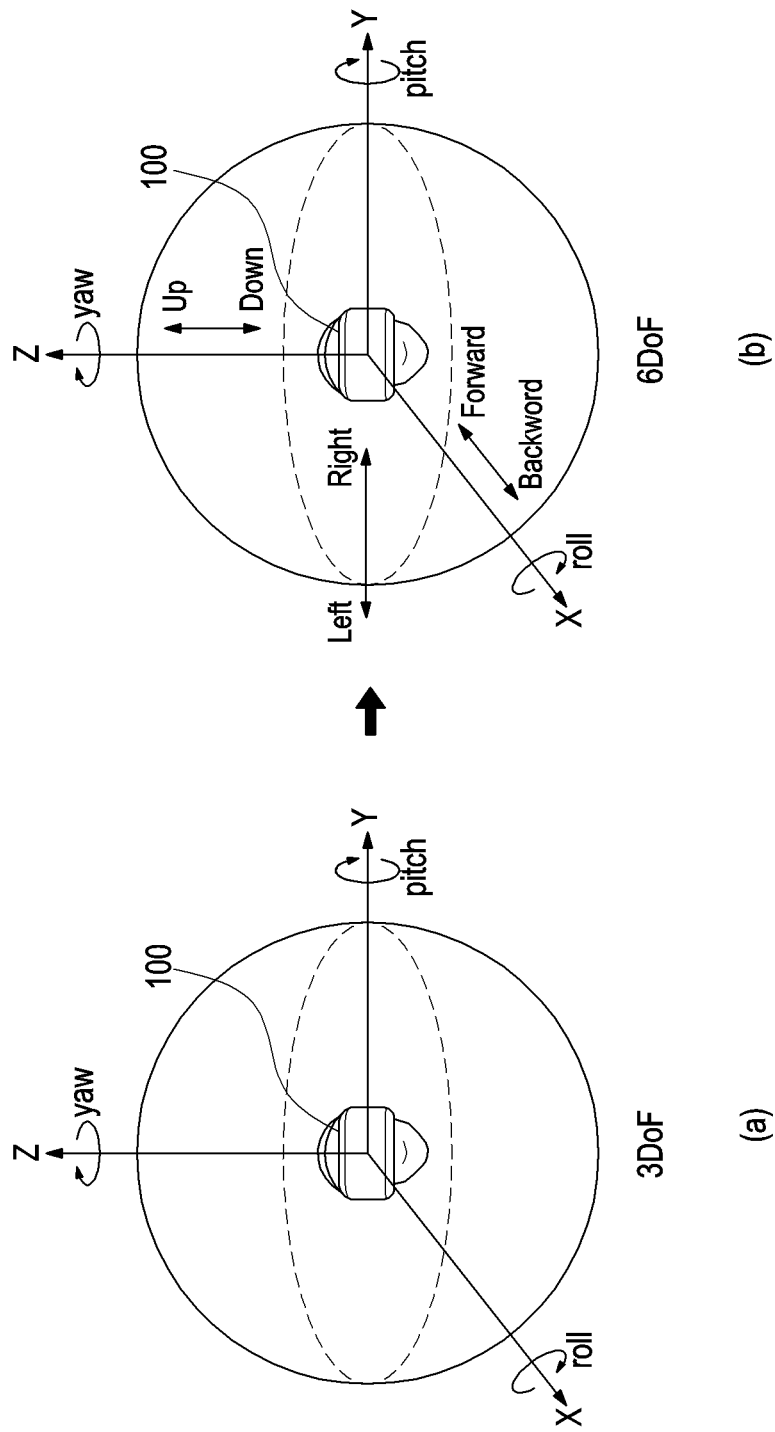
FIG. 1 is a diagram illustrating exemplary 3 degrees of freedom (3DoF) immersive media and 6DoF immersive media according to various embodiments proposed in the disclosure.

Various embodiments of the present disclosure are described with reference to the accompanying drawings. However, the embodiments and terms used herein are not intended to limit the technical scope of the disclosure, and it is to be understood that the present disclosure covers various modifications, equivalents, and/or alternatives. With regard to the description of the drawings, similar reference numerals may be used to refer to similar elements.

In the disclosure, the term "have", "may have", "include", or "may include" signifies the presence of a corresponding feature (e.g., number, function, operation, or component such as part), not excluding the presence of one or more other features.

In the disclosure, the term "A or B", "at least one of A or/and B", or "one or more of A or/and B" may cover all possible combinations of enumerated items. For example, "A or B", "at least one of A and B", or "at least one of A or B" may represent all of the cases of (1) inclusion of at least one A, (2) inclusion of at least one B, and (3) inclusion of at least one A and at least one B.

The term as used in the disclosure, "1$^{st}$", "2$^{nd}$" "first" or "second' may be used for the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the disclosure.

When it is said that a component (e.g., a first component) is "operatively or communicatively coupled with/to" or "connected to" another component (e.g., a second component), it should be understood that the one component is connected to the other component directly or through any other component (e.g., a third component). On the other hand, when it is said that a component (e.g., a first component) is "directly connected to" or "directly coupled to" another component (e.g., a second component), it may be understood that there is no other component (e.g., a third component) between the components.

The term "configured to" as used herein may be replaced with, for example, the term "suitable for", "having the capacity to", "designed to", "adapted to", "made to", or "capable of" under circumstances. The term "configured to" may not necessarily mean "specifically designed (or configured) to" in hardware. Instead, the term "a device configured to" may mean that the device may be "capable of" with another device or part. For example, "a processor designed (or configured) to execute A, B, and C" may mean a dedicated processor (e.g., an embedded processor) for performing the corresponding operations or a generic-purpose processor (e.g., a central processing unit (CPU) or an application processor) for performing the operations.

The terms as used in the disclosure are provided to describe merely specific embodiments, not intended to limit the scope of other embodiments. It is to be understood that singular forms include plural referents unless the context clearly dictates otherwise. The terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the disclosure may not be interpreted as excluding embodiments of the disclosure.

An electronic device according to various embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, mobile medical equipment, a camera, or a wearable device. According to various embodiments of the disclosure, the wearable device may include at least one of an accessory type (e.g., a watch, a ring, a bracelet, an ankle bracelet, a necklace, glasses, contact lenses, or a head-mounted device (HMD)), a fabric or clothes type (e.g., electronic clothes), a body-attached type (e.g., a skin pad or a tattoo), or an implantable type (e.g., an implantable circuit).

According to some embodiments of the disclosure, an electronic device may be a home appliance. The home appliance may include at least one of, for example, a television, a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

According to other embodiments of the disclosure, an electronic device may include at least one of a medical device (e.g., a portable medical meter (a blood glucose meter, a heart rate meter, a blood pressure meter, a body temperature meter, or the like), a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things device (e.g., a lighting bulb, various sensors, an electricity or gas meter, a sprinkler, a fire alarm, a thermostat, a street lamp, a toaster, sports goods, a hot water tank, a heater, a boiler, or the like).

According to some embodiments of the disclosure, an electronic device may include at least one of furniture, part of a building/structure, an electronic board, an electronic signature receiving device, a projector, or various measuring devices (e.g., a water, electricity, gas or electro-magnetic wave measuring device). According to various embodiments, an electronic device may be one or a combination of two or more of the foregoing devices. According to some embodiments, an electronic device may be a flexible electronic device. In addition, an electronic device according to an embodiment of the disclosure is not limited to the foregoing devices, and covers a new electronic device produced along with technology development.

With reference to the attached drawings, an electronic device according to various embodiments will be described below. In the disclosure, the term user may refer to a person or device (e.g., artificial intelligence electronic device) that uses an electronic device.

FIG. 1 is a diagram illustrating exemplary 3 degrees of freedom (3DoF) immersive media and 6DoF immersive media according to various embodiments proposed in the disclosure.

A DoF indicates the degree of reality to which immersive media may be represented in a three-dimensional (3D) space, that is, the degree of freedom with which a user may move at 3D coordinates.

Referring to FIG. 1(a), 3DoF immersive media are illustrated. For the 3DoF immersive media, a user 100 may rotate a viewing point with respect to three axes, the x axis (Roll), the y axis (Pitch), and the z axis (Yaw) in the x, y, z coordinate system.

Because rotation is allowed only upon the axes, a scene of the 3DoF immersive media may be represented only on the surface of a spherical structure. Accordingly, the user 100 wearing a device may view only adjacent viewing points at a fixed location within the 3D sphere without any spatial movement. The device may be a virtual reality (VR) device or an HMD.

Referring to FIG. 1(b), 6DoF immersive media are illustrated. For the 6DoF immersive media, the user 100 may rotate a viewing point with respect to the three axes, the x axis (Roll), the y axis (Pitch), and the z axis (Yaw) in the x, y, z coordinate system. Further, the user 100 may move the viewing point with respect to the x axis (Surge), the y axis (Sway), and the z axis (Heave). That is, the 6DoF immersive media allows the user to move the viewing point forward and backward on the x axis, to the left and right on the y axis, and up and down on the z axis.

Herein, a viewing point refers to a user location.

Because movement along an axis as well as rotation upon the axis is possible, a scene of the 6DoF immersive media may be represented on the surface of a spherical structure and based on internal coordinates. Accordingly, the user may view adjacent viewing points at various locations within the sphere, and may view an object from various angles at the location of the user. That is, for the 6DoF immersive media, the user 100 may move to any coordinates within the 3D sphere and view the immersive media in all 360-degree directions at any coordinates.

While the following description is given of embodiments of the disclosure in the context of 6DoF immersive media, the same thing may apply to 3DoF immersive media.

Figure 2:
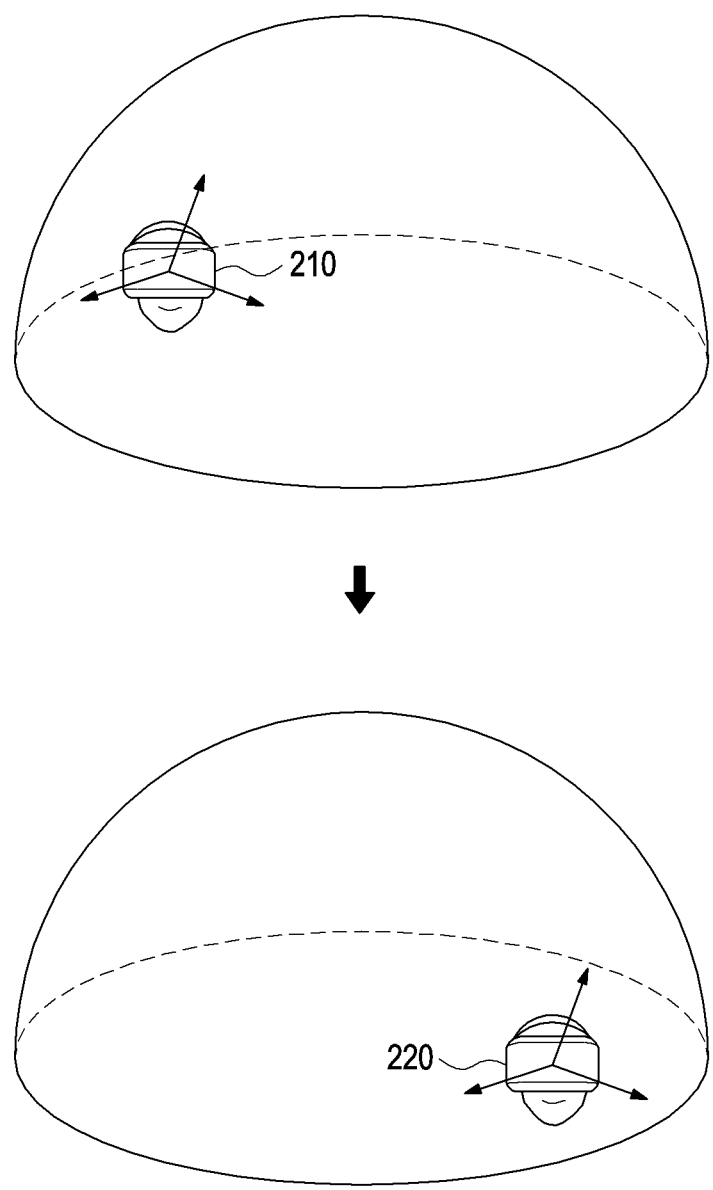
FIG. 2 is a diagram illustrating an example in which the viewing point of a user viewing immersive media is changed according to various embodiments proposed in the disclosure.

FIG. 2 is a diagram illustrating an example in which the viewing point of a user viewing immersive media is changed according to various embodiments proposed in the disclosure.

Referring to FIG. 2, the user may change from a first viewing point 210 to a second viewing point 220. A scene at the second viewing point 220 may not be played back until a user device receives immersive media data corresponding to a viewing direction at the second viewing point 220. A viewing direction refers to a direction in which a user is viewing.

Accordingly, the disclosure proposes a method and apparatus for predicting a new viewing point and/or viewing direction that a user will take and providing space-of-interest description information corresponding to the predicted viewing point and/or viewing direction of the user.

To selectively process immersive media data according to the changed viewing point and/or viewing direction of the user, all or part of immersive media data should be specified. A space in which data is processed selectively in immersive media is referred to as a space of interest (SOI). A plurality of SOIs may exist in one immersive medium. Further, an SOI may conceptually cover a region of interest (ROI) in two-dimensional (2D) video data.

One SOI includes at least one object of interest (OOI). Further, one SOI may be determined based on SOI description information.

The SOI description information may include at least one of the elements of object priority, object speed, object vector (OV), object event, object role, object dependency, internal vector (IV), relation event, relation role, object dependency, IV, relation event, relation role, or external vector (EV).

The object priority represents priority between OOIs included in one SOI.

The object speed is an instantaneous speed at which an OOI moves.

The OV specifies a direction in which an OOI moves within a specific time range. Once the OV of the OOI within a specific time or time range is known, the movement of the OOI may be predicted.

The object event refers to an event that may occur according to the context of content, the contents of a scene being represented, or interaction between users within the specific time range. The properties of the OOI may change according to the type and contents of the generated event.

The object role means a textual representation describing what the OOI represents according to the context of content or the contents of a scene being represented in immersive media. A priority between object relations may be changed according to the object role.

The object dependency represents dependency between OOIs. The object dependency may indicate an equal, dependent, or any other relation between the OOIs.

The IV represents a relation between movements of OOIs within the specific time range within the SOI. Once the IV between the OOIs within the specific time or time range is known, a common movement area between the OOIs may be predicted.

The relation event refers to an event which may occur according to the context of content, the contents of a scene being represented, or interaction between users within the specific time range in the immersive media. The characteristics of a relation between the OOIs may change according to the type and contents of the generated event.

The relation role means a textual representation describing what the relation represents according to the context of content or the contents of a scene being represented in immersive media.

The EV represents a characteristic direction of the SOI within the specific time range. The EV covers the concept of three-dimensionally extending a front, a default viewport, or the like in playing back conventional 2D video-based VR media, omnidirectional media, or other immersive media in a media reception apparatus. That is, when a user views immersive media inside or outside an SOI, a viewing point and/or viewing direction may be determined based on the EV of the SOI. The media reception apparatus may be an HMD.

The EV of the SOI may be different from that of a space of no interest in the total space of the immersive media.

Each element of SOI description information will be described in the following embodiments. While the embodiments are described in the context of a configuration of providing immersive media with the content of a basketball game to a media reception apparatus, this should not be construed as limiting. Further, although the immersive media disclosed in the following embodiments are given as 6DoF multimedia, they may also be 3DoF multimedia.

Figure 3:
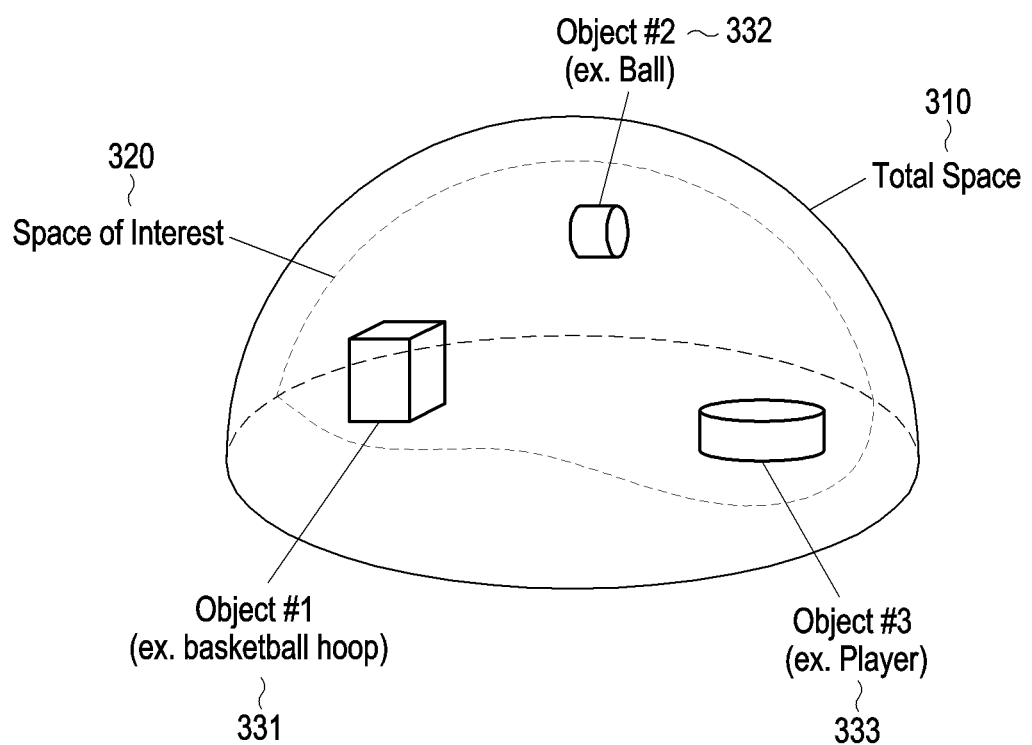
FIG. 3 is a diagram illustrating an exemplary space of interest and exemplary objects of interest according to various embodiments proposed in the disclosure.

FIG. 3 is a diagram illustrating an exemplary SOI and exemplary OOIs according to various embodiments proposed in the disclosure.

To provide immersive media of a basketball game in such a manner that a user is tricked into viewing the basketball game in a real basketball arena, a media transmission apparatus may set a whole space included in the immersive media to a basketball arena. The media transmission apparatus may be a server.

Referring to FIG. 3, the media transmission apparatus may set a limited space of a basketball hoop, a ball, a player, and so on in a total space 310 corresponding to the basketball arena to an SOI 320. In this case, audience seats or a space other than the basketball arena may be outside the SOI 320. Objects existing inside the SOI 320, for example, a basketball hoop 331, a basketball 332, and a last player 333 who threw the basketball may be OOIs.

Figure 4:
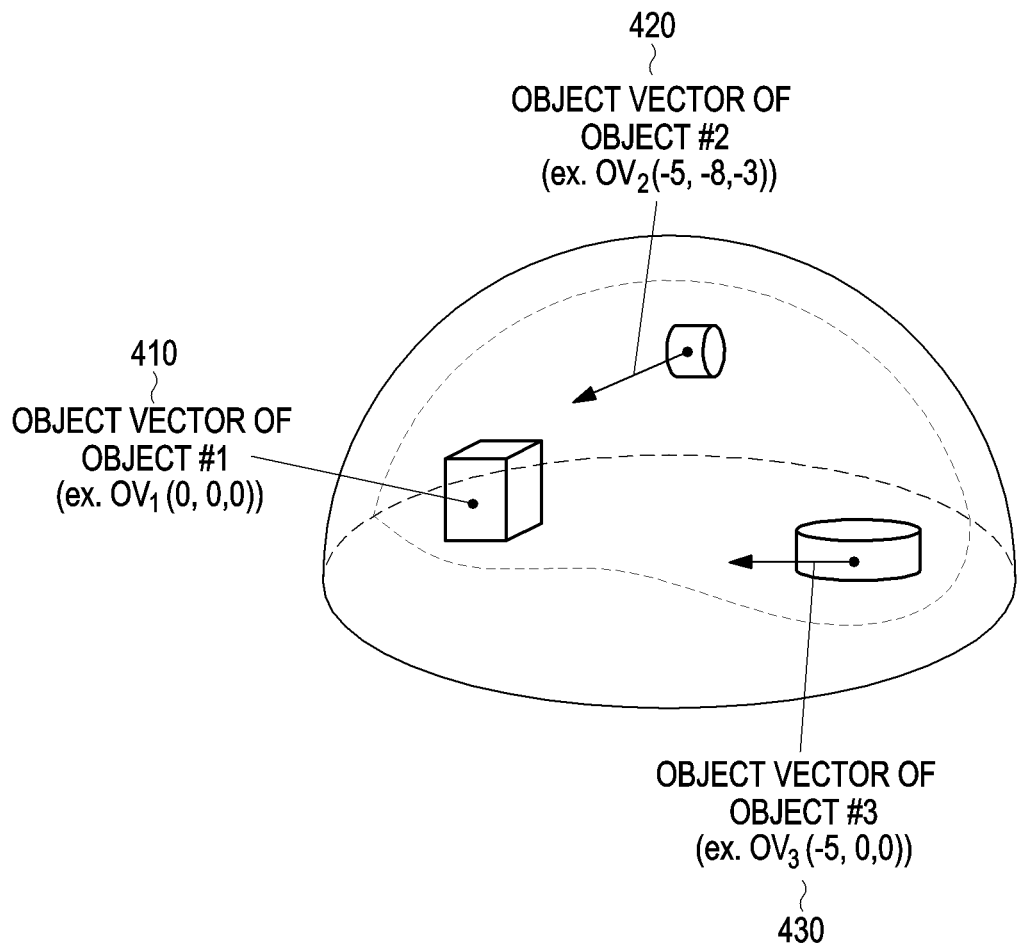
FIG. 4 is a diagram illustrating exemplary object vectors (OVs) of objects of interest according to various embodiments proposed in the disclosure.

FIG. 4 is a diagram illustrating exemplary OVs of OOIs according to various embodiments proposed in the disclosure.

OVs may be determined between the OOIs. An OV may be represented as a form indicating a 3D direction in a 3D space, for example, as an (x, y, z) vector. When a speed corresponding to movement of an OOI as well as the direction of the OOI is to be represented, the absolute values of x, y, z may be represented as numerals equal to or larger than 1.

Referring to FIG. 4, OVs represent the directions and speeds of OOIs 410, 420, and 430. For example, the OVs of the OOI 410 being a basketball hoop fixed at one location, the OOI 420 being the last player who threw the ball, running toward the basketball hoop, and the OOI 430 being the ball that the player threw may be expressed as vectors. The media transmission apparatus may predict trajectories corresponding to movements of the basketball hoop 410, the basketball player 420, and the ball 430 within a specific time range or represent the trajectories, based on the OVs. The media transmission apparatus may predict or determine coordinates and/or a direction in which the user will view the immersive media based on the OVs of the OOIs 410, 420, and 430.

Figure 5:
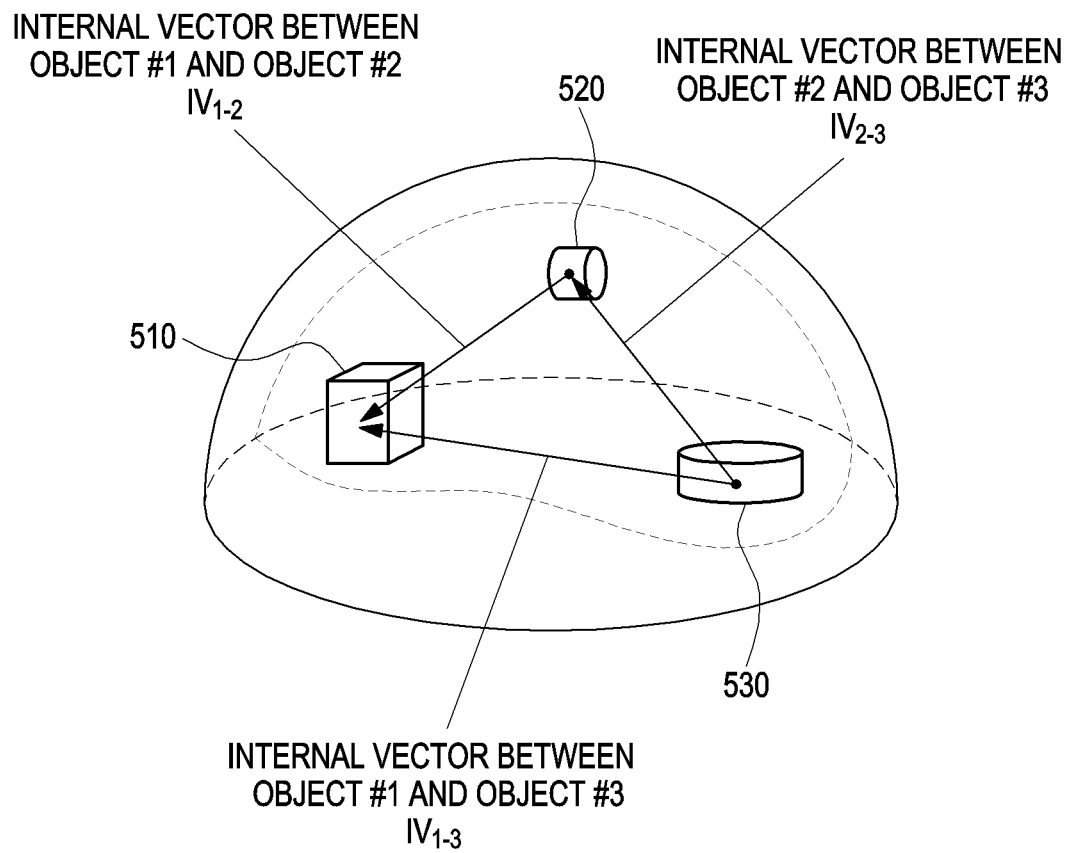
FIG. 5 is a diagram illustrating exemplary internal vectors (IVs) of objects of interest according to various embodiments proposed in the disclosure.

FIG. 5 is a diagram illustrating exemplary IVs of OOIs according to various embodiments proposed in the disclosure.

Referring to FIG. 5, IVs may be set between OOIs corresponding to a basketball hoop 510, a basketball player 520, and a ball 530. In immersive media, a scene of the basketball player 520 throwing the ball 530, while running toward the location of the basketball hoop 510 may be represented. At this time, the IV of the basketball player 520 is set as a direction toward the basketball hoop 510 and the ball 530, and the IV of the ball 530 is set as a direction toward the basketball hoop 510. The media transmission apparatus may represent or predict trajectories corresponding to the movements of the basketball hoop 510, the basketball player 520, and the ball 530 within a specific time range through the IVs.

For example, when the user moves a viewing point and/or a viewing direction to the gaze of the basketball player 520, the user may view in the direction of the ball 530 flying in the air among 360-degree directions with respect to the basketball player 520. The direction of the flying ball 530 may be a direction of interest of the user. The direction of the flying ball 530 may be determined from the IV between the ball 530 and the basketball player 520. The media transmission apparatus may selectively and/or preferentially transmit immersive media data corresponding to the direction of interest from among immersive media data corresponding to the 360-degree directions with respect to the basketball player 520.

Figure 6:
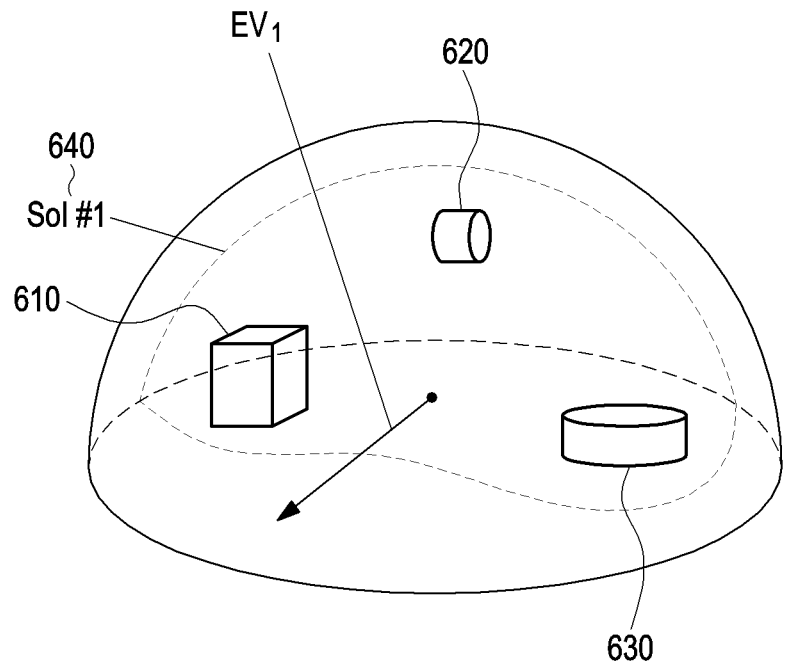
FIG. 6 is a diagram illustrating exemplary external vectors (EVs) of objects of interest according to various embodiments proposed in the disclosure.

FIG. 6 is a diagram illustrating exemplary EVs of OOIs according to various embodiments of the disclosure.

Referring to FIG. 6, an EV may be set in an SOI 640. The EV refers to a characteristic direction of the SOI 640 within a specific time range. The media transmission apparatus may set a reference direction when the user experiences immersive media corresponding to the SOI 640 based on the EV.

For example, when the user views the immersive media in various directions and wants to view again in a viewing point and direction in which main contents are produced in the immersive media, the EV may be used. The main contents may be a situation in which a basketball player 620 throws a ball 630 toward a basketball hoop 610.

Figure 7:
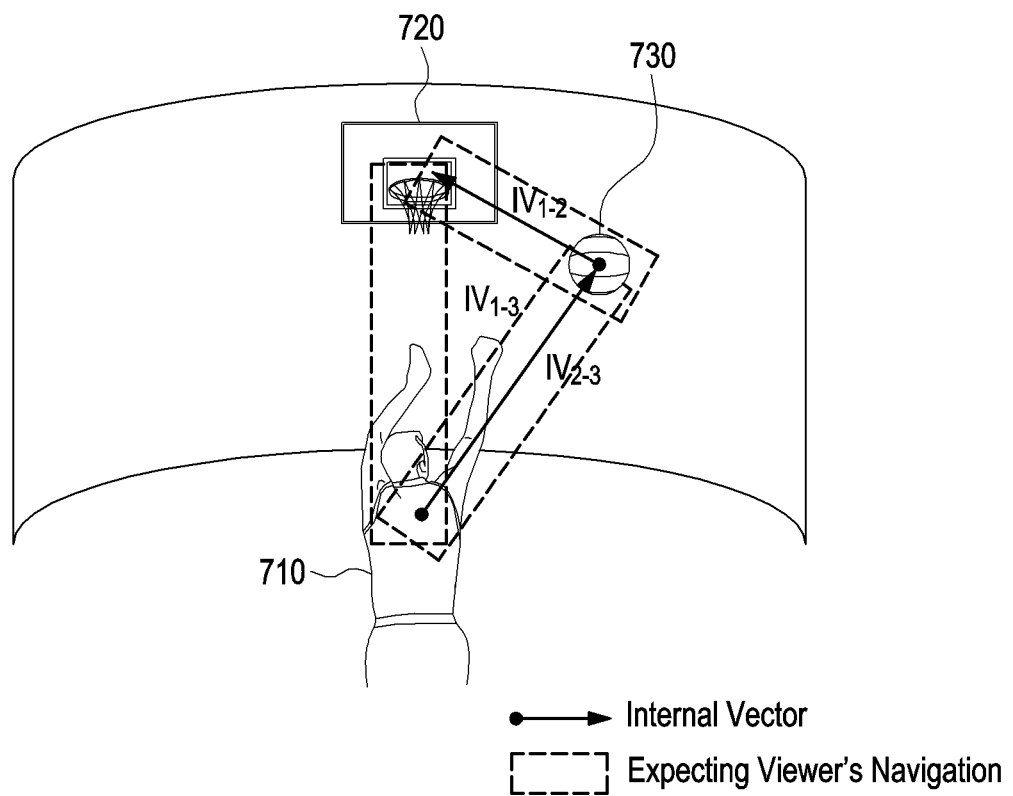
FIG. 7 is a diagram illustrating an example of predicting the viewing direction and/or viewing point of a user regarding immersive media according to various embodiments proposed in the disclosure.

FIG. 7 is a diagram illustrating an example of predicting of the viewing direction and/or viewing point of a user regarding immersive media according to various embodiments proposed in the disclosure.

Elements of SOI description information may be a criterion for determining which data of immersive media data is to be transmitted. Specifically, the media transmission apparatus considers the elements of the SOI description information, when determining which data to selectively and adaptively transmit according to the state of a network environment and the range of a space that the user is currently viewing in total space.

For example, when the user is viewing the immersive media at a specific viewing point inside the SOI, the user is likely to preferentially view the immersive media with respect to an OOI. That is, a scene of the immersive media is likely to be rotated, zoomed in, and zoomed out based on an IV between OOIs.

Referring to FIG. 7, when a scene in which a player 710 is throwing a ball 730, while running toward a basketball hoop 720 is being played, the user is highly likely to view in the direction of the ball 730 from the viewing point of the player 710 to vividly experience the basketball game.

Further, the user is highly likely to watch the OOIs 710, 720, and 730 based on the directionalities of the player 710, the basketball hoop 720, and the ball 730, which are OOIs.

Figure 8:
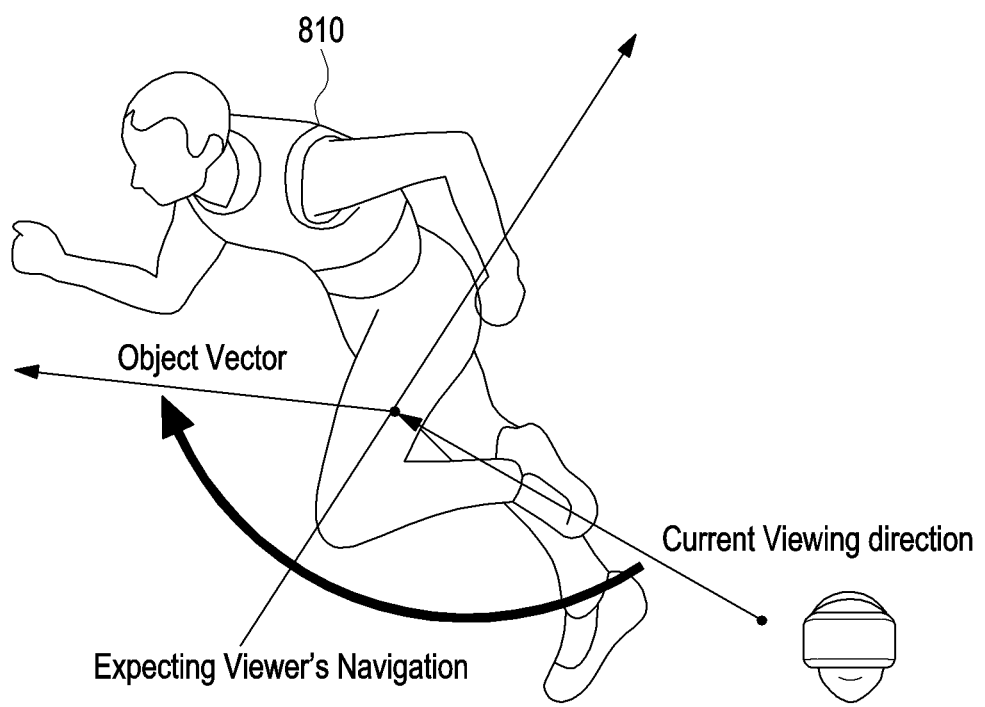
FIG. 8 is a diagram illustrating another example of predicting the viewing direction of a user regarding immersive media according to various embodiments proposed in the disclosure.

FIG. 8 is a diagram illustrating another example of predicting the viewing direction of a user regarding immersive media according to various embodiments proposed in the disclosure.

Compared to the foregoing embodiment in which the user views the surroundings of the player 810 from the viewing point of the player 810, the user may observe a player 810 at various angles from a position around the player 810. In this case, when it is possible to determine a range in which the user may be mainly interested among the appearances of the player corresponding to 360 degrees, only immersive media data corresponding to the determined range may be transmitted to the media reception apparatus, thereby improving transmission efficiency.

The media transmission apparatus may determine the range of interest to the user based on an OV.

Since a player 810 is running to a basketball hoop, the user is highly likely to rotate a scene of the immersive media from a current played angle to an angle in which the user is allowed to see the player 810 in order to watch the face of the player 810 rather than the back of the player 810.

In addition, the media transmission apparatus may determine the characteristics of each OOI and the characteristics of a relation between OOIs as well as the OV of each OOI or an OV between the OOIs as described above in order to determine in which direction the user wants to rotate and watch the scene of the immersive media with respect to which OOI.

For example, the media transmission apparatus may set a basketball player as a highest-priority OOI, and a goalpost or a ball to a lower-priority OOI. In this case, priorities of the relationships between the three OOIs in an SOI may be determined. The media transmission apparatus may further change the priorities of the relationships between the OOIs conditionally, upon occurrence of a specific event.

For example, the media transmission apparatus may change the priorities of OOI relations according to the movement speeds of the OOIs. If the player runs at or above a specific speed, the media transmission apparatus may raise the priority of the relationship between the player and the basketball higher than the priority of the relationship between the player and the goalpost.

In another example, in the case of an SOI from a driver's point of view in a car running on a long road, the media transmission apparatus may increase the priority of an object relation associated with the road when the driving speed is high, and the priority of an object relation associated with the surroundings when the car is stationary.

Accordingly, in the process of transmitting immersive media data, the media transmission apparatus may first transmit immersive media data corresponding to an SOI, instead of all of immersive media data corresponding to a total space.

Further, the media transmission apparatus may first transmit specific immersive media data in consideration of the characteristics of OOIs and their movements, the contextual characteristics of content within a scene, OVs, and an IV between the OOIs even in the SOI.

For example, when the user is viewing the immersive media at a specific viewing point and/or viewing direction outside the SOI within the total space, the user is highly likely to first view a scene of the immersive media, corresponding to one space with respect to the EV of the SOI.

In immersive media for a basketball game, there may be a situation in which the game is playing close around the basketball hoop of team A and a situation in which the game is playing close around the basketball hoop of team B, depending on the time range of the basketball game. The media transmission apparatus may determine a direction from the basketball hoop of team B toward the basketball hoop of team A as the EV of the SOI, when the game is playing close around the basketball hoop of team A, and a direction from the basketball hoop of team A toward the basketball hoop of team B as the EV of the SOI, when the game is close around the basketball hoop of team B.

Accordingly, the media transmission apparatus may determine a range of immersive media data to be transmitted based on the EV of the SOI during transmission of the immersive media data.

According to the above-described embodiment, the media transmission apparatus selectively transmits a part of immersive media data or a part of the immersive media data corresponding to a selected space, based on an SOI, OOIs in the SOI, and OVs.

In addition to selective transmission of immersive media data to the media reception apparatus based on SOI description information, the media transmission apparatus may adaptively transmit the immersive media data to the media reception apparatus.

Adaptive transmission of immersive media data is transmission based on the state of a network, which means a transmission environment, the capability of the media transmission apparatus as a transmission device, and the capability of the media reception apparatus as a reception device. Immersive media data to be transmitted adaptively based on a transmission environment may include elements related to a video quality that the user experiences, such as the resolution, bitrate, frame rate, high dynamic range (HDR) application or non-application, media format (e.g. omnidirectional media format (OMAF) format, point cloud compression format, and so on), or encoding format of the immersive media.

For example, the media transmission apparatus may transmit an SOI out of the total space, with high quality (e.g., ultrahigh definition (UHD)), and transmit the remaining space which does not correspond to the SOI, with general quality (e.g., high definition (HD)). In addition, the SOI may be transmitted in 3D data based on point cloud compression which is a high-capacity, high-quality 6DoF multimedia format, whereas the remaining space may be transmitted in 2D sphere data based on the OMAF file format which is a 3DoF multimedia format.

In addition, the media transmission apparatus may receive current viewing information for the immersive media from the media reception apparatus, determine an SOI corresponding to the user's immersive media viewing direction and/or viewing point predicted based on SOI description information according to the current viewing information, and transmit SOI description information corresponding to the determined SOI and immersive media data corresponding to the determined SOI to the media reception apparatus.

FIG. 9 is a diagram illustrating an SOI descriptor, when immersive media are transmitted by an MPEG media transport (MMT) protocol according to various embodiments proposed in the disclosure.

Referring to FIG. 9, the SOI descriptor is MMT signaling information that describes an SOI in a predetermined time range when the media transmission apparatus transmits immersive media data by the MMT protocol. The SOI descriptor allows the media transmission apparatus to selectively and adaptively transmit all or a part of the immersive media based on selection of the media transmission apparatus and the media reception apparatus or the state of the transmission network.

The SOI descriptor may define an SOI within a predetermined time range in a total space represented by the immersive media, and define OOIs included in the SOI. Each OOI may have its own OV at a specific point and there may be an IV between OOIs. Information about all OVs may change each time within a total time range to which the SOI descriptor is applied.

The SOI descriptor may also define OOIs and the relation speed, relation role, relation priority, relation dependency, and relation event between the OOIs.

Each element of the SOI descriptor has the following meaning.

SOI_id: An ID that identifies an ROI described by the SOI descriptor among one or more SOIs existing in the total space of the immersive media.

SOI_start_time: The starting time of a time range to which contents described by the SOI descriptor are applied. The starting time may be expressed in absolute time, or may be expressed relatively within a full multimedia play time range. The absolute time may be expressed as a timestamp based on a network time protocol (NTP) or universal time coordinated (UTC).

SOI_duration: This indicates a time period from the starting time indicated by SOI_start_time, during which the contents described by the SOI descriptor is to be applied.

SOI_space_structure: This indicates a spatial range to which the contents described by the SOI descriptor are applied in the total space of the immersive media. The spatial range may be expressed as boundary points, boundary planes, or the like of the SOI by using coordinates in a predetermined coordinate system. The SOI may be defined by one or more spheres and planes. For example, it may be defined that a set of points located at the same distance from a specific coordinate correspond to a sphere, and the sphere is defined as a boundary surface, so that the contents described by the SOI descriptor are applied to media data corresponding to all coordinates existing within the boundary surface, and all data related to the media.

SOI_ext_vector: This means the EV of the SOI in the ROI. This is a characteristic direction that the SOI has at a specific timestamp indicated by ext_vector_timestamp. The EV is the basis for determining a reference direction in which the user consumes immersive media corresponding to the SOI. The EV of the SOI may be different from that of a space corresponding to a part of the total space of the immersive media, which is not the SOI. It may be expressed as (x, y, z) coordinates by ext_vector_x, ext_vector_y, and ext_vector_z. Alternatively, a format defined in ext_vector_extension may be used.

num_of objects: This specifies the number of OOIs included in the SOI.

object_id: An ID that distinguishes one or more OOIs from each other in the SOI.

object_space_structure: This indicates the spatial range of an OOI. Like SOI_space_structure, it may be expressed by points, surfaces, and so on using coordinate values in the predetermined coordinate system.

Object_priority: Priority between the OOIs in the SOI. Priority may be considered in combination with dependency (object_dependency) on other OOIs in the SOI and an object role of an OOI (object role).

Object speed: An instantaneous speed of the OOI. If the OOI is associated with multiple related OOIs (related_obj_id), the importance of each relationship may be determined in combination with object_priority, object_dependency, object_event, object_role, relation_event, and relation_role.

object_vector: This means the OV of the OOI. It is the direction in which the OOI moves at the specific timestamp indicated by object_vector_timestamp. It helps to predict movement of the OOI before and after the time indicated by object_vector_timestamp. The OV may be represented as (x, y, z) coordinates by using object_vector_x, object_vector_y, and object_vector_z. Alternatively, the format defined by object_vector_extension may be followed.

object_event: When the property of the OOI may change according to an event that occurs, this indicates the properties of the OOI and the event.

object_role: The role of the OOI. For example, this is a textual representation of a scene in current media such as a person, an object, a main character, an assistant performer, a prop, a ball, or the like.

Num_of_related_objs: This specifies the number of OOIs having a directional relationship with the OOI.

related_obj_id: This indicates the object_id of an OOI having the directional relationship with the OOI.

object_dependency: This describes the dependency between the OOI indicated by object_id and the related OOI indicated by related_obj_id. For example, it may be expressed as an equal relationship, or whether the OOI indicated by related_obj_id corresponds to a master or a slave in a master-slave relationship.

internal_vector: This indicates a relationship between movements of the OOI and the related OOI. the IV between the OOIs at the timestamp indicated by int_vector_timestamp helps to predict movement from one OOI to the other OOI, or to predict an area of common movement between the OOIs. It may be expressed as (x, y, z) coordinates using int_vector_x, int_vector_y, and int_vector_z. Alternatively, the format defined by int_vector_extension may be followed.

relation_event: When the property of the immersive media content may be changed according to an event that occurs, this describes the event and the property.

relation_role: This describes the role of a relation. For example, it is a textual representation describing a scene in current media such as driving, sports, and scenery.

Figure 10:
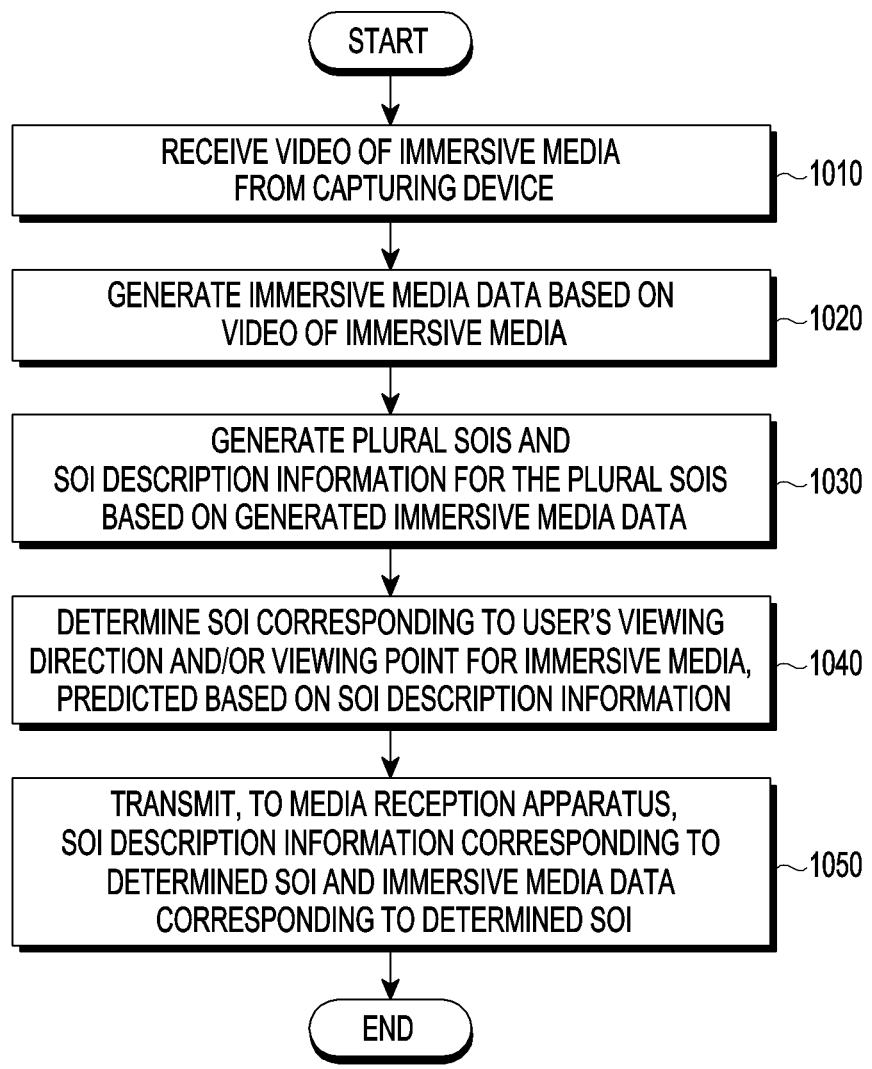
FIG. 10 is a diagram illustrating a control flow for predicting the viewing direction of a user regarding immersive media according to various embodiments proposed in the disclosure.

FIG. 10 is a diagram illustrating a control flow for predicting the viewing direction of a user regarding immersive media according to various embodiments proposed in the disclosure.

Referring to FIG. 10, the media transmission apparatus may receive a video of immersive media from a capturing device in operation 1010. The video of the immersive media may be compressed video data.

In operation 1020, the media transmission apparatus may generate immersive media data based on the video of the immersive media. When generating the immersive media data, the media transmission apparatus may use multimedia generation tools such as video stitching, 3D modeling, and so on.

In operation 1030, the media transmission apparatus may generate a plurality of SOIs and SOI description information for the SOIs based on the generated immersive media data. The media transmission apparatus may use an object recognition tool, a behavior recognition tool, and camera feature-related factors to generate the SOI description information, for example, OOIs, OVs, IVs, and EVs. The SOI and elements included in the SOI have been described before with reference to FIGS. 3 to 8.

In operation 1040, the media transmission apparatus may determine an SOI corresponding to a viewing direction and/or a viewing point of the user for the immersive media, predicted based on the SOI description information.

In operation 1050, the media transmission apparatus may transmit SOI description information corresponding to the determined SOI and immersive media data corresponding to the determined SOI to the media reception apparatus. The media transmission apparatus may process the immersive media data and the SOI description information in a format of a transmission protocol predetermined with the media reception apparatus and then transmit the processed immersive media data to the media reception apparatus. For example, when the predetermined transmission protocol is the multimedia multiplexing transport protocol (MMTP), the media transmission apparatus may configure the immersive media data as a media processing unit (MPU) data and then transmit the MPU in MMTP packets to the media reception apparatus. Further, the media transmission apparatus may configure the SOI description information as MMT signaling and then transmit the MMT signaling in MMTP packets to the media reception apparatus. Operation 1050 has been described in detail with reference to FIG. 8.

While the embodiment of transmitting SOI description information and immersive media data which correspond to a determined SOI by the media transmission apparatus has been described above, the media transmission apparatus may transmit SOI description information corresponding to a plurality of SOIs and total immersive media data.

Figure 11:
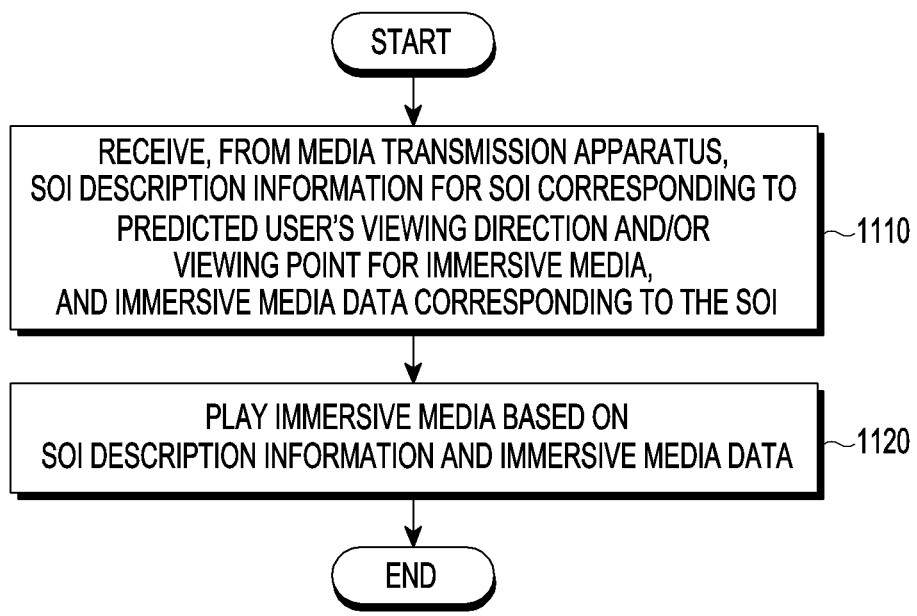
FIG. 11 is a diagram illustrating a control flow for playing back immersive media according to various embodiments proposed in the disclosure.

FIG. 11 is a diagram illustrating a control flow for playing back immersive media according to various embodiments proposed in the disclosure.

Referring to FIG. 11, the media reception apparatus may receive SOI description information for an SOI corresponding to a predicted viewing direction and/or viewing point of a user for immersive media and immersive media data corresponding to the SOI from the media transmission apparatus in operation 1110.

In operation 1120, the media reception apparatus may play the immersive media based on the SOI description information and the immersive media data. The media reception apparatus may play the immersive media in correspondence with an SOI and/or a viewing direction and/or a viewing point, which has been moved by the user. For example, when the contents of the immersive media are a basketball game, the media reception apparatus may play the immersive media so that the user may watch the basketball game from the viewpoint of the audience or a player.

Further, the media reception apparatus may transmit at least one of user interaction information, information about the environment of the media reception apparatus, or information about a network environment to the media transmission apparatus. For example, the media reception apparatus may transmit information about the user's viewing direction, head tracking, eye tracking, a video quality-related capability of the media reception apparatus, a network state, or a user selection. The media transmission apparatus may predict a viewing point and/or viewing direction of the user based on the at least one of the user interaction information, the information about the environment of the media reception apparatus, or the information about a network environment received from the media reception apparatus, and set an SOI corresponding to the predicted viewing point and/or viewing direction of the user. The media transmission apparatus may transmit SOI description information corresponding to the determined SOI and immersive media data corresponding to the determined SOI to the media reception apparatus.

The media reception apparatus may provide an interactive experience to the user by playing back the immersive media. The interactive experience refers to an additional service of providing a customized advertisement service, a related video, an advertisement, a Web page, or the like.

Figure 12:
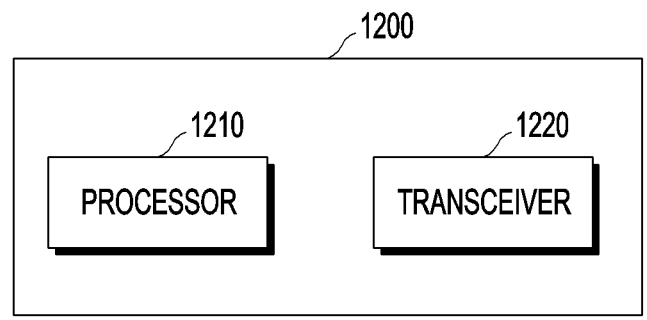
FIG. 12 is a block diagram of a media transmission apparatus according to various embodiments proposed in the disclosure.

FIG. 12 is a block diagram of a media transmission apparatus according to various embodiments proposed in the disclosure.

Referring to FIG. 12, a media transmission apparatus 1200 may include a processor 1210 and a transceiver 1220.

The processor 1210 and the transceiver 1220 may perform the operations described before with reference to FIGS. 3 to 9.

Figure 13:
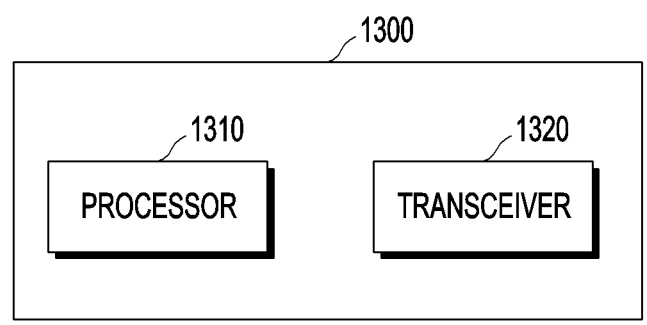
FIG. 13 is a block diagram of a media reception apparatus according to various embodiments proposed in the disclosure.

FIG. 13 is a block diagram of a media reception apparatus according to various embodiments proposed in the disclosure.

Referring to FIG. 13, a media reception apparatus 1300 may include a processor 1310 and a transceiver 1320.

The processor 1310 and the transceiver 1320 may perform the operations described before with reference to FIGS. 3 to 8 and FIG. 10.

While the embodiments of the disclosure have been described with reference to the attached drawings. Those skilled in the art will understand that the disclosure may be practiced in other specific forms without changing the technical idea and essential features of the disclosure. Therefore, the above-described embodiments should be understood as exemplary, not limiting, in all aspects.

The invention claimed is:

1. A method of supporting an immersive media service by a media transmission apparatus, the method comprising:
   determining a space of interest (SOI) among a plurality of SOIs based on SOI description information; and
   transmitting, to a media reception apparatus, first SOI description information corresponding to the determined SOI among the SOI description information, and first immersive media data corresponding to the determined SOI among immersive media data, when the first SOI description information is different from second SOI description information which is previously transmitted,
   wherein the first SOI description information includes a priority indicator indicating a priority of each of a plurality of objects of interest (OOIs) in the SOI, a vector indicating a movement direction of each of the plurality of OOIs, an indicator indicating dependency between an OOI and other OOI related to the OOI, and information on object role describing what the OOI represents in a scene being represented in immersive media, and
   wherein the priority of the OOI is determined based on the dependency between the OOI and the other OOI and the object role of the OOI.

2. The method of claim 1, further comprising obtaining the first SOI description information.

3. The method of claim 1, further comprising:
   determining a video quality for transmission of the first SOI description information and the first immersive media data,
   wherein the transmission of the first SOI description information and the first immersive media data comprises transmitting the first SOI description information and the first immersive media data with the determined video quality.

4. The method of claim 1, wherein the first SOI description information further includes a starting time indicator indicating a time range to which the first SOI description information is applied.

5. The method of claim 4, wherein the first SOI description information further includes an indicator indicating a predetermined time period applied from a starting time indicated by the starting time indicator.

6. The method of claim 1, wherein the first SOI description information further includes a direction indicator indicating the determined SOI at a predetermined time.

7. The method of claim 1, wherein the first SOI description information further includes an instantaneous speed indicator indicating an instantaneous speed of the OOI.

8. The method of claim 1, wherein when a property of the OOI is changed according to an event occurring to the immersive media data, the first SOI description information further includes an indicator indicating properties of the OOI and the event.

9. The method of claim 1, wherein the first SOI description information further includes an indicator indicating a movement between the OOI and other OOI related to the OOI.

10. The method of claim 1, wherein the first immersive media data is represented by a degree of freedom a user moves in a three-dimensional (3D) coordinate system.

11. The method of claim 1, wherein the first immersive media data is represented by a degree of freedom a user moves in a six-dimensional (6D) coordinate system.

12. A method of supporting an immersive media service by a media reception apparatus, the method comprising:
receiving first space of interest (SOI) description information corresponding to a SOI among a plurality of SOIs and first immersive media data corresponding to the SOI, wherein the first SOI description information is different from second SOI description information which is previously received; and
playing immersive media based on the first SOI description information and the first immersive media data,
wherein the first SOI description information includes a priority indicator indicating a priority of each of a plurality of objects of interest (OOIs) in the SOI, a vector indicating a movement direction of each of the plurality of OOIs, an indicator indicating dependency between an OOI and other OOI related to the OOI, and information on object role describing what the OOI represents in a scene being represented in immersive media, and
wherein the priority of the OOI is determined based on the dependency between the OOI and the other OOI and the object role of the OOI.

13. The method of claim 12, wherein the first SOI description information further includes a starting time indicator indicating a time range to which the first SOI description information is applied.

14. The method of claim 13, wherein the first SOI description information further includes an indicator indicating a predetermined time period applied from a starting time indicated by the starting time indicator.

15. A media transmission apparatus comprising:
a transceiver; and
a processor coupled to the transceiver,
wherein the processor is configured to:
determine a space of interest (SOI) among a plurality of SOIs based on SOI description information, and
transmit, to a media reception apparatus, first SOI description information corresponding to the determined SOI among the SOI description information, and first immersive media data corresponding to the determined SOI among immersive media data, when the first SOI description information is different from second SOI description information which is previously transmitted,
wherein the first SOI description information includes a priority indicator indicating a priority of each of a plurality of objects of interest (OOIs) in the SOI, a vector indicating a movement direction of each of the plurality of OOIs, an indicator indicating dependency between an OOI and other OOI related to the OOI, and information on object role describing what the OOI represents in a scene being represented in immersive media, and
wherein the priority of the OOI is determined based on the dependency between the OOI and the other OOI and the object role of the OOI.

16. A media reception apparatus comprising:
a transceiver; and
a processor coupled to the transceiver,
wherein the processor is configured to:
receive first space of interest (SOI) description information corresponding to a SOI among a plurality of SOIs and first immersive media data corresponding to the SOI, wherein the first SOI description information is different from second SOI description information which is previously received, and
play immersive media based on the first SOI description information and the first immersive media data,
wherein the first SOI description information includes a priority indicator indicating a priority of each of a plurality of objects of interest (OOIs) in the SOI, a vector indicating a movement direction of each of the plurality of OOIs, an indicator indicating dependency between an OOI and other OOI related to the OOI, and information on object role describing what the OOI represents in a scene being represented in immersive media, and
wherein the priority of the OOI is determined based on the dependency between the OOI and the other OOI and the object role of the OOI.

* * * * *